US008746942B2

(12) United States Patent
Bracale

(10) Patent No.: US 8,746,942 B2
(45) Date of Patent: Jun. 10, 2014

(54) TUBULAR SKYLIGHT

(76) Inventor: Gennaro Bracale, Ispra (IT)

( * ) Notice: Subject to any disclaimer, the term of this patent is extended or adjusted under 35 U.S.C. 154(b) by 227 days.

(21) Appl. No.: 13/382,833

(22) PCT Filed: Jun. 18, 2010

(86) PCT No.: PCT/IB2010/052759
§ 371 (c)(1),
(2), (4) Date: Feb. 1, 2012

(87) PCT Pub. No.: WO2011/004278
PCT Pub. Date: Jan. 13, 2011

(65) Prior Publication Data

US 2012/0134170 A1 May 31, 2012

(30) Foreign Application Priority Data

Jul. 10, 2009 (IT) .............................. MI2009A1236

(51) Int. Cl.
*F21V 7/04* (2006.01)
*G02B 17/00* (2006.01)

(52) U.S. Cl.
USPC ................... 362/555; 362/1; 362/2; 362/145; 362/557; 52/200

(58) Field of Classification Search
USPC ............ 362/147, 249.02, 364, 404, 555, 1, 2, 362/145, 557; 52/200
See application file for complete search history.

(56) References Cited

U.S. PATENT DOCUMENTS

| | | | | |
|---|---|---|---|---|
| 4,114,186 | A * | 9/1978 | Dominguez | 362/35 |
| 5,528,471 | A * | 6/1996 | Green | 362/147 |
| 6,142,645 | A | 11/2000 | Han | |
| 6,840,645 | B2 * | 1/2005 | Eisenman et al. | 362/2 |
| 7,736,014 | B2 * | 6/2010 | Blomberg | 362/145 |
| 2002/0060283 | A1 * | 5/2002 | Jordan et al. | 250/205 |
| 2009/0085497 | A1 | 4/2009 | Osborn | |
| 2010/0061088 | A1 * | 3/2010 | Bartol et al. | 362/184 |
| 2011/0044041 | A1 * | 2/2011 | Jaster | 362/249.02 |
| 2012/0087113 | A1 * | 4/2012 | McClellan | 362/147 |
| 2012/0230020 | A1 * | 9/2012 | Rillie et al. | 362/147 |

FOREIGN PATENT DOCUMENTS

| | | | |
|---|---|---|---|
| DE | 44 39 507 | A1 | 5/1996 |
| EP | 2 028 410 | A1 | 2/2009 |
| GB | 2 408 321 | A | 5/2005 |
| JP | 2007 311201 | A | 11/2007 |

* cited by examiner

*Primary Examiner* — Stephen F Husar
*Assistant Examiner* — James Cranson, Jr.
(74) *Attorney, Agent, or Firm* — Pearne & Gordon LLP

(57) ABSTRACT

A tubular skylight, comprising a tubular body (2) provided with an inner reflecting surface (3), a light collector (4) mounted to a first end of the tubular body (2) and a light diffuser (6) mounted to a second end of said tubular body (2). The skylight further comprises a source of artificial light (9) external to the tubular body (2) to enable it not to interfere with the natural light, and mounted in the vicinity of the diffuser (6). This artificial-light source (9) is preferably defined by a plurality of LEDs positioned around the diffuser (6) itself.

19 Claims, 6 Drawing Sheets

TUBULAR SKYLIGHT

The present invention relates to a tubular skylight. Tubular skylights or, according to the CIE definition, CIE report TC-3/38 n° 173:2006, tubular guides of natural light, are adapted to bring the natural light into environments whose location in the building where they are makes natural illumination difficult or impossible through use of traditional skylights and/or windows.

Already known by themselves are tubular skylights which generally comprise a tubular body provided with an inner reflective and diffusive surface. The tubular skylight, at a first end of the tubular body designed to be placed at the outside of the building, is provided with a light collector consisting of a transparent dome. At a second end of the tubular body designed to be placed inside the environment to be illuminated, the tubular skylight is provided with a diffuser comprising a panel of translucent material.

Such a tubular skylight is known from document EP 1 306 606, in the name of the same Applicant, for example.

Tubular skylights of known type are able to bring a percentage of external or outdoor light that can even reach 70%-80%, into the environment to be illuminated.

Unfortunately, as the external outdoor light or luminosity decreases, for example at sunset or due to the presence of cloudiness or the particular geographical position of the building, in order to keep the required luminosity in the indoor environment, it is necessary to resort to the artificial light through known electric lighting systems with incandescent lamps, neon tubes, etc. As a result, in the same environment it is necessary to carry out works for installing both the tubular skylight and wall or ceiling lamps for example, and the related electric system.

As a partial solution to these drawbacks, tubular skylights have been conceived and are known which are provided with lamps installed inside the tubular body, the artificial light of which is diffused in the environment to be illuminated by means of the same diffuser through which the natural light passes, and operation of which generally takes place manually and is of the on/off type.

Disadvantageously, the presence of the electric lamp in the tubular body drastically reduces the skylight efficiency that is obtained with difficulty by means of the inner reflecting surface, preferably of the mirror type, because it is an hindrance for transmission of the natural light from the natural-light collector. In addition, the artificial-light flux generated by the lamp only partly reaches the environment to be lit while for about 50% it is dispersed towards the collector and the external environment, which will also contribute to light pollution. The non-utilisation of part of the artificial-light flux involves use of powerful lamps so as to obtain the desired brightness in the indoor environment. Furthermore, people that are in the room lit by known tubular skylights as above described do not distinguish which type of light (natural or artificial) is lighting the environment, because they come both from the diffuser. This warped perception negatively affects a human physique (the individual's sight and eye reactions and therefore indirectly the individual's fatigue) even if awareness of it is not immediate.

In this context, the technical task underlying the present invention is to propose a tubular skylight of the hybrid type capable of overcoming the above mentioned drawbacks of the known art.

In particular, it is an aim of the present invention to make available a tubular skylight in which the artificial-light source in integrated with the natural-light source.

Another aim of the invention is to propose a tubular skylight allowing a predetermined brightness or luminosity value to be maintained inside the environment to be illuminated, also in the presence of variations in the external natural light.

A further aim of the invention is to propose a tubular skylight providing the maximum efficiency in transmitting both the natural light and the artificial light, which will bring about an important electric energy saving.

The technical task mentioned and the aims specified are substantially achieved by a tubular skylight comprising the technical features set out in one or more of the appended claims.

Further features and advantages of the present invention will become more apparent from the description given by way of non-limiting example of a preferred but not exclusive embodiment of a tubular skylight, as shown in the accompanying drawings, in which.

Figure 1:
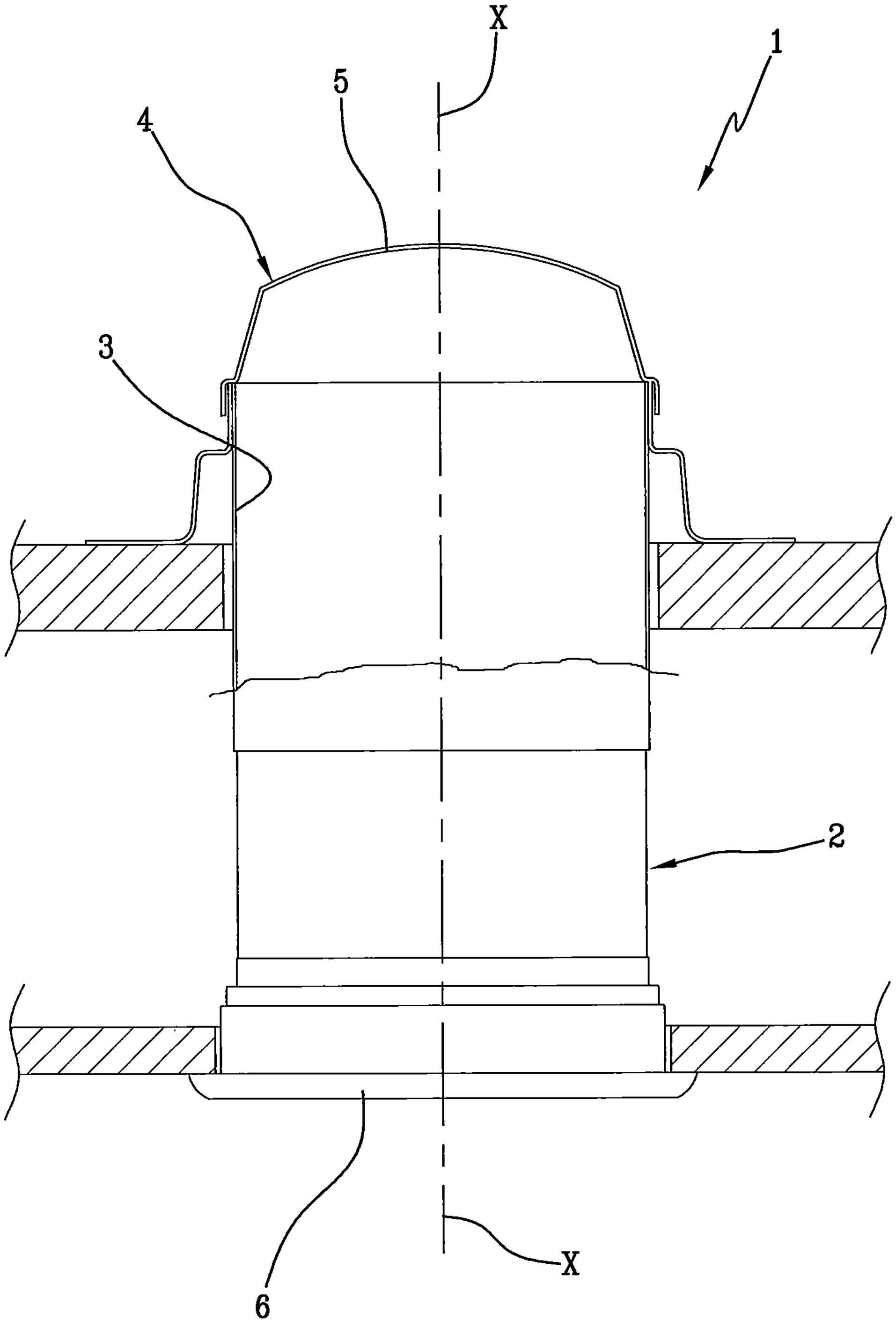
FIG. 1 is a diagrammatic view partly in section of a tubular skylight according to the present invention.

With reference to the accompanying figures, a tubular skylight made in accordance with the present invention has been generally identified by reference numeral 1.

The tubular skylight 1 comprises a tubular body 2 preferably of circular section, which is provided with a reflecting inner surface 3, so as to bring the light from a first to a second end thereof. The tubular body 2 can have a rectilinear axis or a more complicated shape, so that it can adapt itself to the sizes and structure of the building on which it is installed. For instance, the tubular body 2 may extend from the building roof, through the attic, until a chamber to be lit, following a rectilinear path or a path with deflections for avoiding possible obstacles.

A light collector 4 is installed on the first end of the tubular body 2, which end is designed to be positioned externally (on the roof or a wall, for example) of the building in which the skylight 1 is mounted. The light collector 4 comprises a transparent dome 5, including possible optical devices for addressing the light rays into the duct, which dome closes said first end of the tubular body 2 that internally behaves like a mirror-finished body, not shown.

Figure 4:
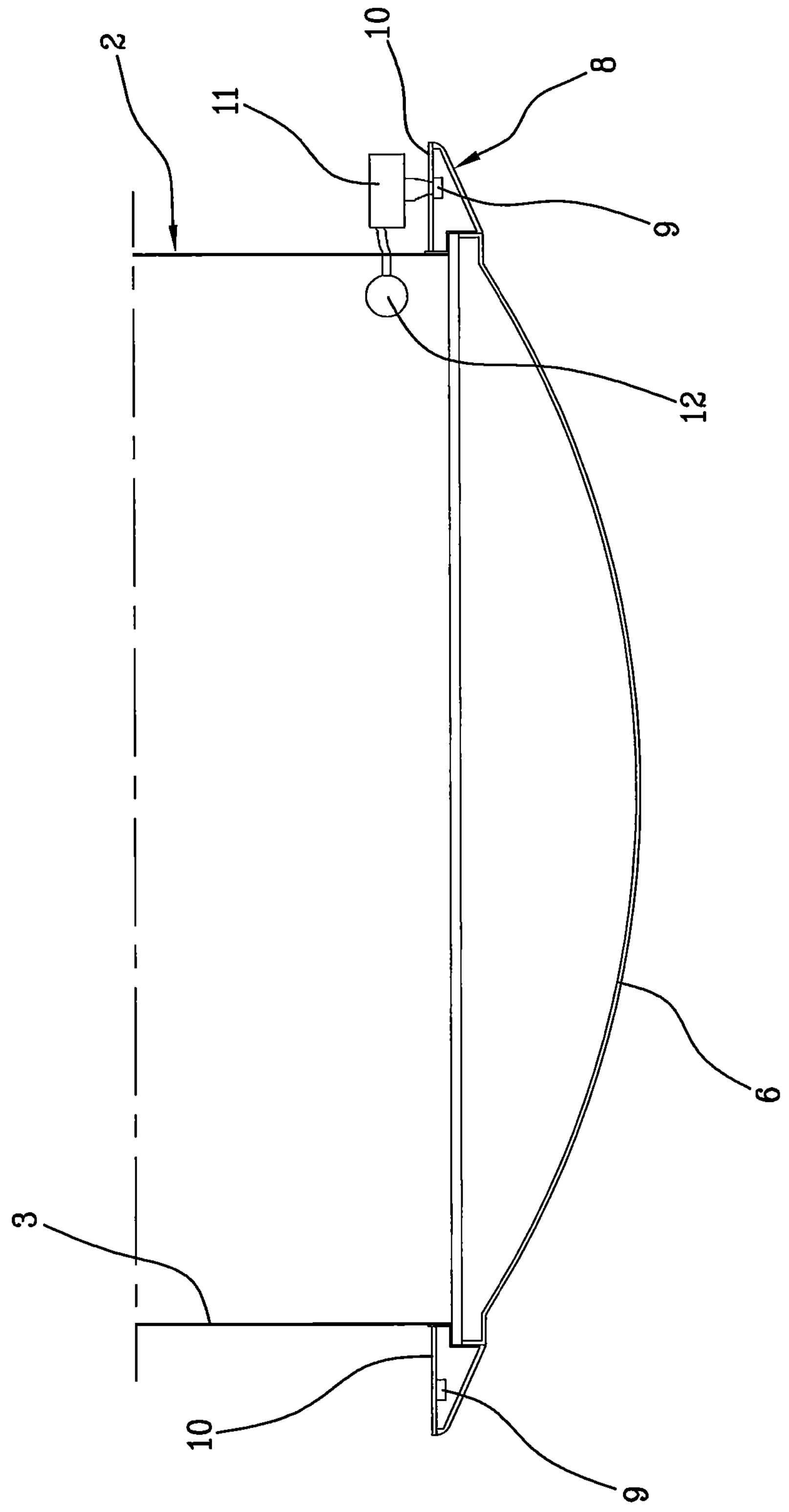
FIG. 4 shows an alternative embodiment of the portion in FIG. 2.
Figure 5:
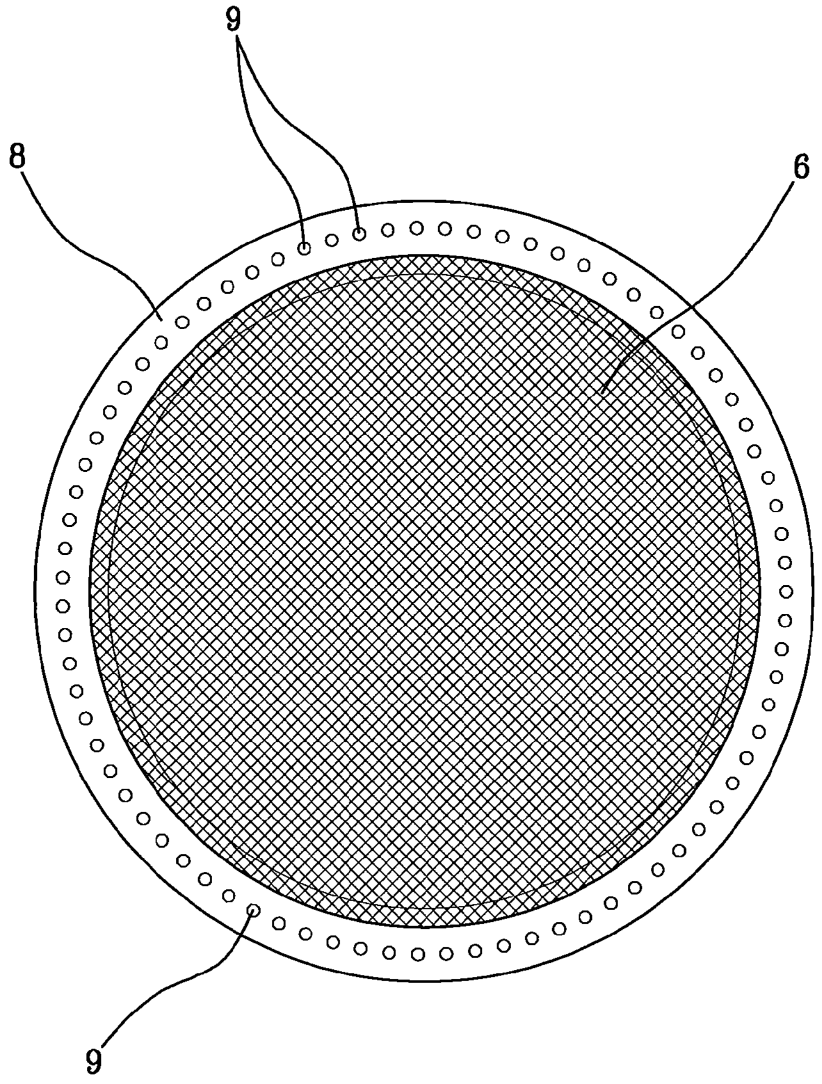
FIG. 5 is a bottom view of the portion in FIG. 4.

A diffuser 6 is mounted on the second end of the tubular body 2 designed to be positioned within the environment to be illuminated (a ceiling or a wall, for example), said diffuser 6 consisting of a transparent screen with particular optical properties which intercepts the light brought by the tubular body 2 and diffuses it in the environment to be illuminated. The peripheral shape of diffuser 6 can be of circular form, for example (FIGS. 4 and 5), with substantially the same sizes as those of the cross-section of the tubular body 2, or of square form (FIGS. 2 and 3), or more generally said diffuser can have a polygonal shape. If diffuser 6 is of polygonal shape with the tubular body 2 of circular section, the skylight 1 further comprises a box-shaped body 7 provided with a circular mouth for engagement with the tubular body 2 and a polygonal flange for engagement with diffuser 6. Diffuser 6 is hooked to the tubular body 2 by hooking means known by themselves.

A frame 8 is further disposed around the diffuser 6 for covering and concealing the hollow space between the wall that has been drilled for enabling passage of the tubular body 2 or box-shaped body 7, and the diffuser 6 itself. In the embodiment in FIGS. 1-3, the frame 8 is integral with the box-shaped body 7.

Advantageously, the skylight 1 further comprises an artificial-light source 9 integrated into the skylight 1 itself, external to the tubular body 2 so that it does not interfere with the natural light and operating simultaneously and in co-operation with the natural light from the outside. The artificial light advantageously does not pass through diffuser 6. The artificial-light source 9 preferably consists of a plurality of punctiform light sources 9 disposed around diffuser 6 and adapted to illuminate the same environment as that illuminated by the natural light. The two light components, the natural one emitting spectral bands with the maximum faithfulness in the visible spectrum, and the artificial one typical of the artificial source 9 used, are individually perceptible and both and simultaneously contribute to the indoor illumination of the room with the sum of the respective fluxes of light.

In the embodiment shown, the punctiform light sources are light emitting diodes (LEDs) mounted on an annular support 10, preferably made of aluminium, also acting as a heatsink. The annular support 10 can further have possible cooling fins, not shown, to increase heat dissipation and efficiency of the LEDs. Use of a great number of LEDs, in addition allows operation to the network voltage of 230V or 115V.

Figure 3:
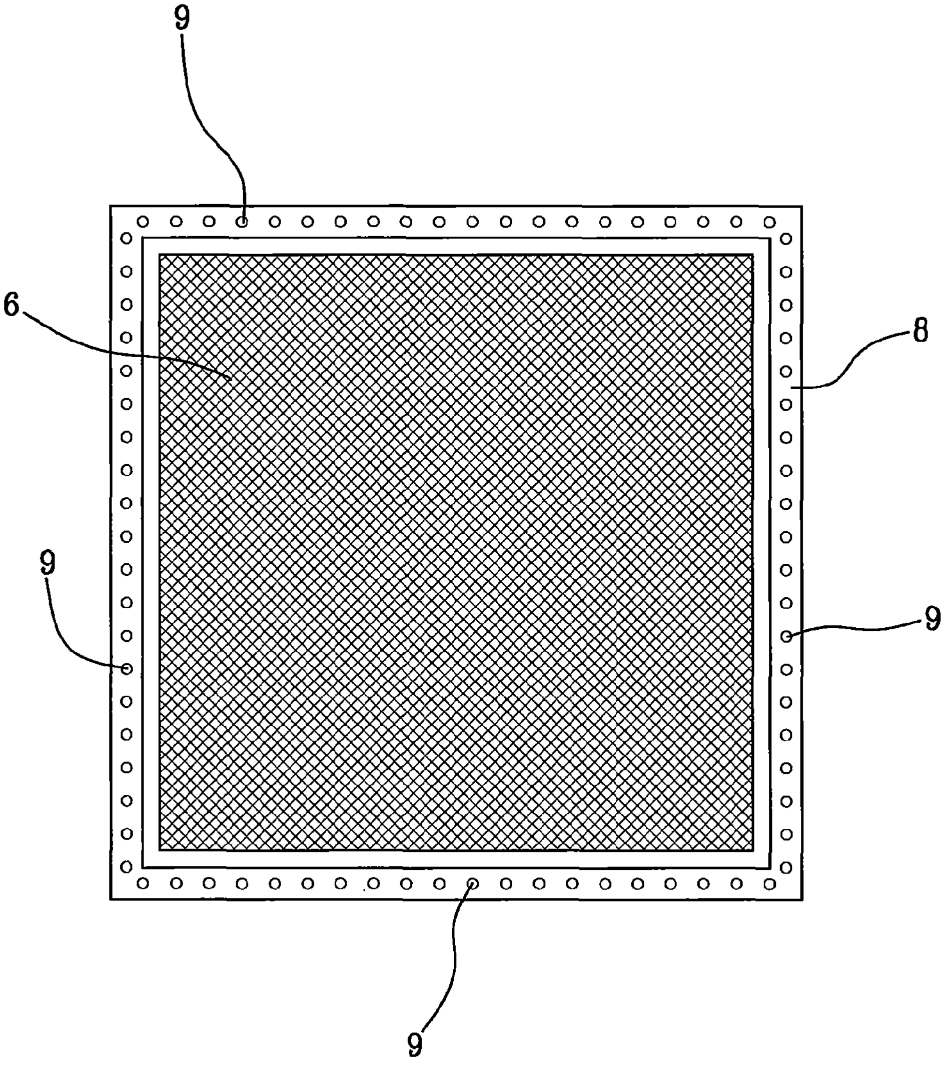
FIG. 3 is a bottom view of the portion in FIG. 2.

In the present specification and the appended claims, the adjective "annular" means a form that closes upon itself and can be circular (as in FIG. 5) or have another shape such as oval, square (as shown in FIG. 3), or more generally polygonal.

The annular support 10 is positioned around diffuser 6 and is hooked to the tubular body 2. The annular support 10 and diodes 9 mounted thereon, when the skylight 1 has been installed, are covered by frame 8 that is transparent, possibly of the diffusing type or coloured, and lets the artificial light pass at least partly. The number, arrangement and colour of the light emitted by the LEDs can be selected based on the specific technical and aesthetic illumination requirements.

Figure 2:
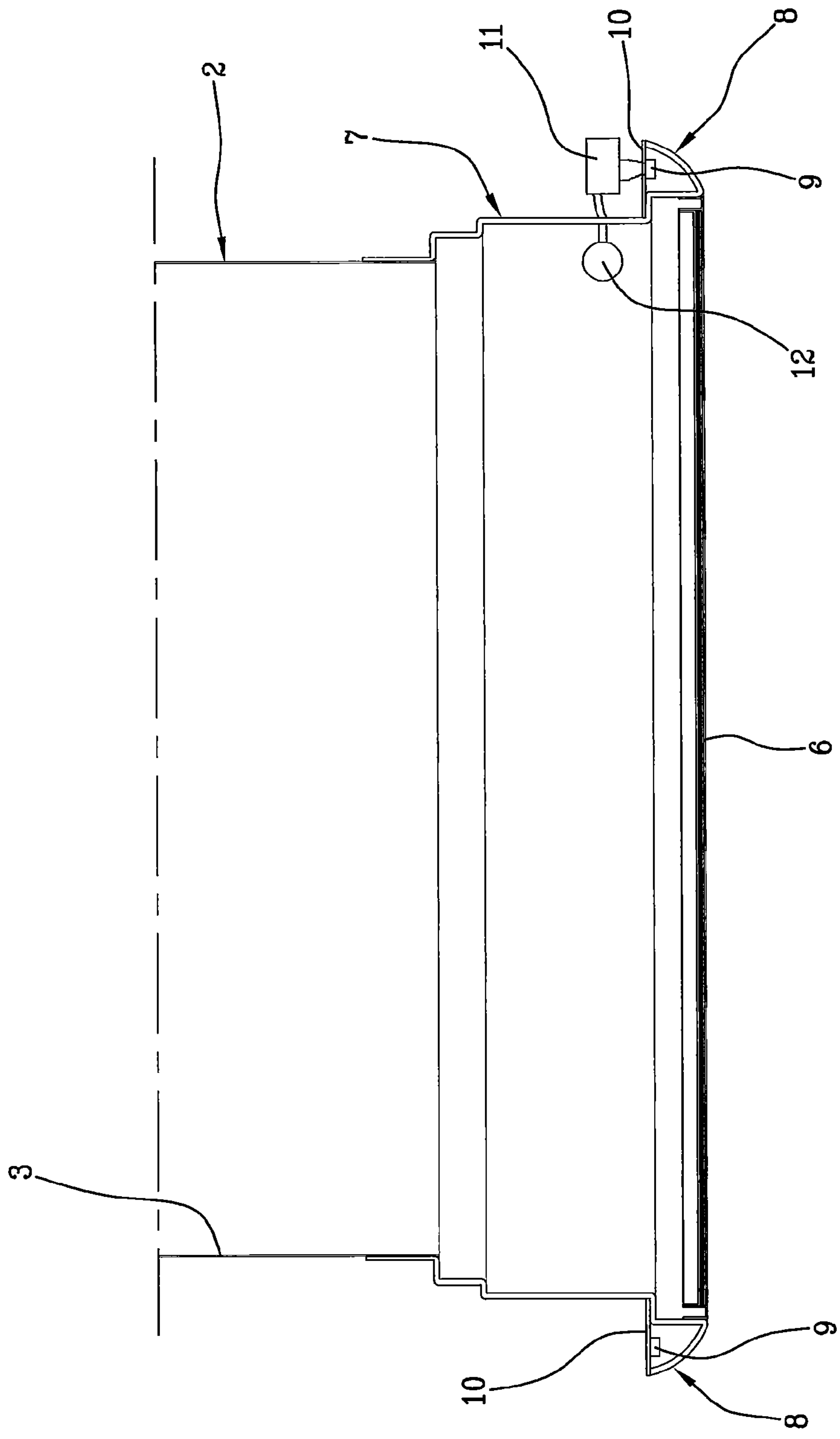
FIG. 2 shows an enlarged portion in longitudinal section of the skylight seen in FIG. 1.

The skylight 1 further comprises an adjustment unit operatively connected to the LEDs for controlling the supply voltage and the resulting flux of light $\Phi_a$ of same. The adjustment unit 11 can be mounted on the skylight 1, as shown in FIG. 2 for example, on the annular support 10 itself, or wall installed and connected to the skylight 1 through suitable wiring systems.

In addition, the adjustment unit 11 is operatively connected to at least one luminosity sensor 12 capable of detecting the luminous flux $\Phi_n$ of the natural light and sending a respective signal to the adjustment unit 11. The luminosity sensor 12 can be installed on the skylight 1, in the tubular body 2 for example, in the collector 4 or close to the diffuser 6 (as shown in FIG. 2), or preferably inside the room to be illuminated.

In the adjustment unit 11 a range of values is set that correspond to the required values of the overall luminous flux $\Phi_{tr}$ in the environment to be illuminated. This range of values in a preferred embodiment of the invention can be adjusted by the final user through a suitable command. This range of values can be also set as a single value specific to the required overall luminous flux $\Phi_{tr}$. Alternatively, several fields of values/specific values can be set among which the final user is allowed to choose.

The adjustment unit 11 compares the true overall luminous flux $\Phi_{te}$, given by the sum of the luminous flux $\Phi_a$ of the artificial source of light 9, proportional to the voltage applied to the LEDs, and the luminous flux $\Phi_n$ of the natural light, measured by sensor 12, and varies the voltage to the LEDs in such a manner as to keep the true overall luminous flux $\Phi_{te}$ within the required range of values.

Preferably, this range of values or specific value is close to or substantially the same as the value of maximum luminous flux supplied by the natural light alone during the day. In this manner, for most of the time, the artificial source of light 9 is maintained off or works to the minimum power.

In accordance with an alternative and simpler embodiment, the skylight 1 does not comprise any sensor and the adjustment unit contains a timer and only varies the voltage and therefore the intensity of the artificial light, based on the different hours.

The adjustment unit 11 can also comprise a device for excluding the automatic control and enabling the user to manually adjust the artificial flux through a dimmer.

Figure 6:
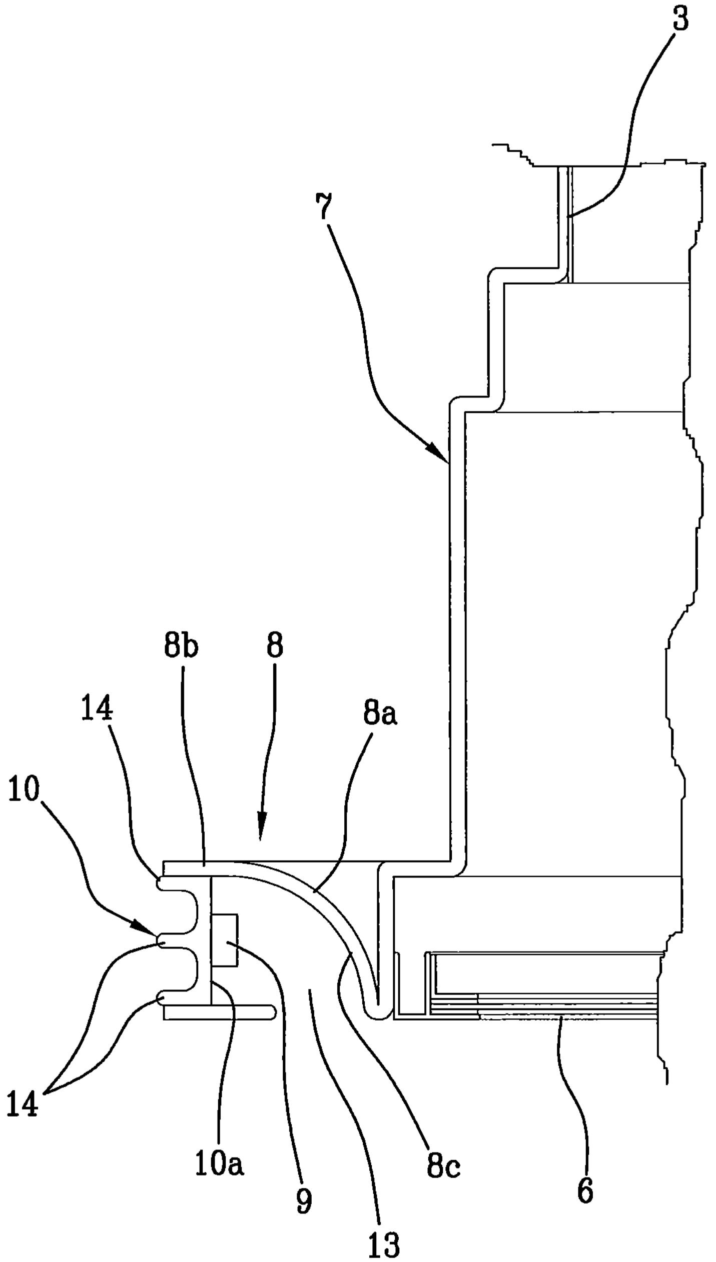
FIG. 6 shows a further alternative embodiment of the skylight according to the present invention.

In accordance with a further alternative embodiment shown in FIG. 6, the frame 8 does not cover the artificial-light source 9. In greater detail, frame 8 radially extends towards the outside relative to diffuser 6, first by a curved portion **8*a* then continuing with a substantially flat portion 8*b***.

In the embodiment shown in FIG. 6 the curved portion **8*a* forms a single body with the box-shaped body 7 but, according to different versions not shown, frame 8 can also consist of an element separated from said box-shaped body 7**, although disposed in approached relationship therewith.

In the embodiment shown in FIG. 6 the substantially flat portion **8*b* is perpendicular to the main axis "X-X" of the tubular body 2. The curved portion 8*a* has a concave and reflecting surface 8*c* facing away from diffuser 6. In other words, the concave and reflecting surface 8*c* has an annular (circular or polygonal, for example) shape in plan view and substantially is in the form of a truncated cone (when circular) or a truncated pyramid (when polygonal) tapering towards diffuser 6. The concave and reflecting surface 8*c* extends all around diffuser 6**.

The annular support 10 is mounted on the substantially flat portion **8*b* of frame 8 and has a support surface 10*a* perpendicular to said substantially flat surface 8*b* and facing towards the concave and reflecting surface 8*c*. Emerging from the support surface 10*a* are the light sources 9. The light emitted from the light sources 9 is directed to the concave and reflecting surface 8*c* and is reflected by said concave and reflecting surface 8*c* and deviated to the environment to be illuminated. The light emitted from the light sources 9 and deviated passes through an annular opening 13 delimited between the box-shaped body 7 and the annular support 10**.

The annular support 10 further has cooling fins 14 on the side opposite to the support surface **10*a***.

The annular support 10 in accordance with one embodiment consists of section members made of aluminium disposed close to each other at the ends thereof, so as to define a polygon (four section members forming a square, for example) or a single circular body.

With reference to alternative embodiments still in accordance with the present invention, the annular support 10, if it reaches important sizes and weights, is supported by structural elements, not shown or described in detail, hooked to bearing parts of the building attic for example, and disposed around the tubular body 2.

The present invention reaches the intended purposes and achieves important advantages.

The tubular skylight according to the present invention ensures a predetermined value of luminous flux in the lighted environment also in the presence of variations in the external brightness or luminosity.

Advantageously, adjustment of the artificial-light source takes place in an automatic manner.

In addition, the user is able to personally set the brightness he/she wishes to obtain or necessary for performing a particular activity.

Elimination of every obstacle to the natural light inside the tubular body and substantial exploitation of the whole artificial luminous flux allow the skylight efficiency to be maximised and the electric energy consumption to be minimised giving rise to an important energy saving.

With reference to the embodiment in FIG. 6, the artificial-light diffusion operated through the reflecting surface has a positive influence on the individual's perception and fatigue.

The invention claimed is:

1. A tubular skylight, comprising:

a tubular body (2) provided with an inner reflecting surface (3);

a light collector (4) mounted to a first end of the tubular body (2);

a light diffuser (6) mounted to a second end of said tubular body (2);

a frame (8) disposed around the diffuser (6);

a source of artificial or indoor light (9);

wherein the source of artificial light (9) is external to the tubular body (2) and is positioned at said frame (8) and that the artificial light does not pass through the diffuser (6) so that it does not interfere with the natural light;

wherein the artificial-light source (9) comprises a plurality of punctiform light sources disposed all around the diffuser (6).

2. A tubular skylight as claimed in claim 1, wherein the frame (8) is translucent and covers the artificial-light source (9).

3. A tubular skylight as claimed in claim 2, wherein the plurality of light sources disposed around the diffuser (6) are of the LED (Light Emitting Diode) type.

4. A tubular skylight as claimed in claim 1, wherein the plurality of light sources disposed around the diffuser (6) are of the LED (Light Emitting Diode) type.

5. A tubular skylight as claimed in claim 1, comprising an annular support (10) disposed around the diffuser (6), wherein the artificial-light source (9) is mounted on said support (10).

6. A tubular skylight as claimed in claim 5, wherein the support (10) comprises at least one heatsink.

7. A tubular skylight as claimed in claim 1, comprising an adjustment unit (11) adapted to vary the artificial light as a function of the natural light.

8. A tubular skylight as claimed in claim 7, comprising at least one luminosity sensor (12) adapted to detect at least the luminous flux ($\Phi_n$) of the natural light and to transmit a signal indicating said luminous flux ($\Phi_n$) of the natural light to the adjustment unit (11).

9. A tubular skylight as claimed in claim 8, wherein in the adjustment unit (11) a range of values of the overall luminous flux ($\Phi_{tr}$) required in the environment to be lit can be set; the adjustment unit (11) varying the luminous flux ($\Phi_a$) of the artificial-light source (9) in such a manner that the sum of the luminous flux ($\Phi_n$) of the natural light and the luminous flux ($\Phi_a$) of the artificial-light source (9) falls within said range of values of the required luminous flux ($\Phi_{tr}$).

10. A tubular skylight as claimed in claim 9, wherein the range of values of the required luminous flux ($\Phi_{tr}$) is close to or substantially corresponds to the value of maximum luminous flux provided by the natural light alone during the day.

11. A tubular skylight as claimed in claim 1, wherein the frame (8) has a reflecting surface (8*c*) facing the artificial-light source (9), for deviating the light emitted by said artificial-light source (9) to the environment to be lit.

12. A tubular skylight as claimed in claim 11, wherein the reflecting surface (8*c*) is concave.

13. A tubular skylight as claimed in claim 11, wherein the reflecting surface (8*c*) extends all around the diffuser (6).

14. A tubular skylight as claimed in claim 13, wherein the artificial-light source (9) comprises a plurality of light sources (9) disposed around the reflecting surface (8*c*) and facing said reflecting surface (8*c*).

15. A tubular skylight as claimed in claim 14, comprising an annular support (10) mounted on the annular frame (8) at a radially external position relative to the reflecting surface (8*c*), wherein the light sources (9) are mounted on said annular support (10) and wherein said annular support (10) comprises a plurality of cooling fins (14).

16. A tubular skylight as claimed in claim 12, wherein the reflecting surface (8*c*) extends all around the diffuser (6).

17. A tubular skylight, comprising:

a tubular body (2) provided with an inner reflecting surface (3);

a light collector (4) mounted to a first end of the tubular body (2);

a light diffuser (6) having circular or square form, mounted to a second end of said tubular body (2);

a frame (8) disposed around the diffuser (6);

a source of artificial or indoor light (9);

wherein the source of artificial light (9) comprises a plurality of punctiform light sources which are placed all around the diffuser (6) and external to the tubular body (2), and which are mounted on an annular support (10) placed around the tubular body (2), so that the artificial light does not pass through the diffuser (6) and does not interfere with the natural light.

18. A tubular skylight, comprising:

a tubular body (2) provided with an inner reflecting surface (3);

a light collector (4) mounted to a first end of the tubular body (2);

a light diffuser (6) mounted to a second end of said tubular body (2);

a frame (8) disposed around the diffuser (6);

a source of artificial or indoor light (9);

wherein the source of artificial light (9) comprises a plurality of punctiform light sources which are placed all around the diffuser (6) and external to the tubular body (2), and which are mounted on an annular support (10) placed around the tubular body (2);

wherein said annular support (10), also acting as a heatsink, is disposed in a plane perpendicular to the main axis (X-X) of the end portion of the tubular body (2) so that the artificial light sources (9) mounted thereon are directed downwards so that the artificial light does not pass through the diffuser (6) and does not interfere with the natural light;

wherein the frame (8) is translucent and covers the artificial-light source (9).

19. A tubular skylight, comprising:

a tubular body (2) provided with an inner reflecting surface (3);

a light collector (4) mounted to a first end of the tubular body (2);

a light diffuser (6) mounted to a second end of said tubular body (2);

a frame (8) disposed around the diffuser (6);

a source of artificial or indoor light (9);

wherein the source of artificial light (9) comprises a plurality of punctiform light sources which are placed all around the diffuser (6) and external to the tubular body (2), and which are mounted on an annular support (10) placed around the tubular body (2);

wherein said annular support (10), acting also as a heatsink, is disposed substantially parallel to the main axis (X-X) of the end portion of the tubular body (2), so that the artificial-light sources (9), emerging from the annular support (10) and directed to the main axis (X-X) of the tubular body (2) are disposed all around diffuser (6);

wherein the frame (8) has a concave reflecting surface (8*c*) facing the artificial-light source (9), for deviating the light emitted by said artificial-light source (9) to the environment to be lit; said reflecting surface (8*c*) being placed at a radially internal position relative to the annular support (10), extending all around the diffuser (6) and facing away from the diffuser (6), so that the artificial light does not pass through the diffuser and does not interfere with the natural light.

* * * * *